United States Patent [19]

Seymour et al.

[11] 3,927,203

[45] Dec. 16, 1975

[54] COSMETIC COMPOSITIONS EMPLOYING CERTAIN COMPOLYMERS

[75] Inventors: Donald Edwin Seymour, London; Nicholas Mario da Costa, Harlow; William Thomas Charville, Ware, all of England

[73] Assignee: Hydron Limited, London, England

[22] Filed: Oct. 26, 1973

[21] Appl. No.: 409,821

Related U.S. Application Data

[63] Continuation-in-part of Ser. No. 867,378, Oct. 17, 1969, abandoned.

[30] Foreign Application Priority Data

Oct. 22, 1968 United Kingdom............... 50043/68
Dec. 20, 1968 United Kingdom............... 60755/68

[52] U.S. Cl. .................... 424/61; 424/47; 424/63; 424/81
[51] Int. Cl.$^2$ ................ A61K 7/04; A61K 7/021; A61K 31/78
[58] Field of Search............ 260/81.1 E; 424/61, 63, 424/81

[56] References Cited

UNITED STATES PATENTS

| 2,458,888 | 1/1949 | Rehberg et al. ..................... 260/83 |
| 2,565,259 | 8/1951 | Nyquist............................... 117/141 |
| 3,269,903 | 8/1966 | Fieandt et al......................... 424/81 |
| 3,488,331 | 1/1970 | Jorgensen ......................... 260/80.76 |

*Primary Examiner*—V. D. Turner

[57] ABSTRACT

The invention relates to compositions for application to a human being or other animal and provide such a composition which comprises (1) a copolymer obtainable by copolymerising (a) at least one alkoxy alkyl acrylate or methacrylate with (b) at least one different alkoxy alkyl acrylate or methacrylate or at least one hydroxy alkyl acrylate or methacrylate and optionally with a minor amount of a further monomer, and (ii) a suitable carrier. The compositions are applied to the epidermis (including skin, nails and/or hairs) of a human being or other animal and useful as e.g. nail varnishes, wound dressings and cosmetic preparations.

16 Claims, No Drawings

COSMETIC COMPOSITIONS EMPLOYING CERTAIN COMPOLYMERS

RELATED APPLICATION

The present application is a continuation-in-part of U.S. patent application, Ser. No. 867,378 filed Oct. 17, 1969 now abandoned, which is relied upon and the entire disclosure and specification of which is hereby incorporated by reference.

The present invention relates to coating compositions suitable for application to human beings or other animals, e.g. for medical or decorative purposes.

According to the present invention there is provided a composition for application to human being or other animal which comprises (i) a copolymer, obtainable by copolymerizing (a) at least one alkoxy alkyl acrylate or methacrylate with (b) at least one different alkoxy alkyl acrylate or methacrylate or at least one hydroxy alkyl acrylate or methacrylate and optionally with a minor amount of a further monomer, and (ii) a suitable carrier, preferably a liquid.

The alkoxy portion of the alkoxy alkyl acrylates and methacrylates is preferably unbranched.

Where the copolymer used is one obtainable by reaction of an alkoxy alkyl acrylate or methacrylate with a different alkoxy alkyl acrylate or methacrylate it may be preferred that no other monomers are present. By this is meant that no monomers are present in the reaction mixture other than alkoxy alkyl acrylates and polymers thereof. It is to be understood that a minor amount of the alkyl ester of the free acid may be present as an impurity.

Preferably the minor amount of further monomer is no more than 10% by volume based on the total volume of monomers.

Where reference is made to the optional use of a further monomer it is to be appreciated that more than one such further monomer may be used if desired.

Preferred further monomers are acrylic acid, methacrylic acid, mono- acrylates of glycols and polyglycols (e.g. glycerol and polyalkylene glycols), and mono - methacrylates of glycols and polyglycols (e.g. glycerol and polyalkylene glycols).

The further monomer or monomers may be present as an impurity in the major constituents of the reaction mixture or may be specifically added.

The present invention also provides a process for the production of a copolymer which comprises copolymerizing, in an inert atmosphere, (a) an alkoxy alkyl acrylate or methacrylate with (b) a hydroxy alkyl acrylate or methacrylate or a different alkoxy alkyl acrylate or methacrylate and optionally with a monor amount of a further monomer.

A free radical initiator, preferably a catalyst, for example, tertiary butyl peroctoate may be used. The reaction may be performed in a solvent, preferably by refluxing in an inert carbon dioxide or nitrogen atomsphere for 8 hours. Preferred solvents for polymerizations involving hydroxy alkyl acrylates or methacrylates are for example ethyl acetate, industrial methylated spirits, ethanol, methanol or dimethyl fomamide. Preferred solvents for polymerizations not involving hydroxy alkyl acrylates or methacrylates are for example ethyl acetate, toluene, dimethyl formamide or an isopropyl/-water mixture.

The copolymer may be precipitated by pouring into a nonsolvent such as petroleum ether.

Alternatively, the reaction may be taken almost to completion, i.e. almost all of the monomer converted to polymer by refluxing, e.g. for 24 hours, to give a solution of the copolymer.

Preferred monomers are hydroxy ethyl methacrylate (HEMA); ethoxy ethyl methacrylate (EEMA) and methoxy ethyl methacrylate (MEMA).

Where hydroxy alkyl acrylates and methacrylates are used (e.g. HEMA) it may be desirable to use no more than 90% by volume of the hydroxy monomer.

Preferred alkoxy alkyl acrylate or methacrylate/alkoxy alkyl acrylate or methacrylate copolymers are obtained by copolymerising MEMA and EEMA preferably in volume ratios of 80/20; 70/30; 60/40; 50/50; 40/60; 30/70; and 20/80.

In the alkoxy alkyl acrylates and methacrylates and the hydroxy alkyl acrylates and methacrylates, the hydroxy or alkoxy group is usually not attached to the carbon atom of the alkyl group connected to the oxygen of the ester linkage. For example the HEMA used is usually 2-hydroxyethyl methacrylate, the MEMA used is usually 2-methoxyethyl methacrylate, the EEMA used is usually 2-ethoxyethyl methacrylate, the HPA used is usually 2-hydroxypropyl acrylate and the HPMA used is usually 2-hydroxypropyl methacrylate.

Other monomers which have been found to be useful include 2-methoxyethyl acrylate, 2-ethoxyethyl acrylate, 2-butoxyethyl acrylate, 2-propoxyethyl acrylate, methoxymethyl methacrylate, ethoxymethyl methacrylate and 2-butoxyethyl methacrylate.

The liquid carrier is preferably a solvent for the copolymer or a liquid which together with the copolymer forms an emulsion. For example some copolymers of low HEMA content may be emulsion polymerised and the invention is intended to include such emulsions.

Suitable solvents may include amyl acetate, isopropanol, toluene, ethanol, ethyl acetate, acetone and methyl ethyl ketone.

Films and coatings obtained from use of the composition of the invention are generally moisture vapour and gas (preferably air) permeable.

The properties of the films and coatings depend on the type and proportion of the monomers. For example copolymers of EEMA and MEMA and containing a high proportion of MEMA will tend to be stiff and brittle (especially at temperatures in the region of 5°C) whereas similar copolymers containing a large proportion of EEMA will be flexible.

By selecting the particular copolymer used, a water resistant (affording better protection) or a water affected film (aiding removal) may be obtained.

The films and coatings are normally transparent but if desired they may be pigmented.

The compositions of the present invention are particularly suitable for use as nail varnishes, wound dressings and cosmetic preparations such as eye liners. Where desirable the composition may include modifiers such as pigments and resins.

Included within the scope of the expression cosmetic preparations are preparations used for stage make-up and special effects such as preparations for simulating dried and fresh blood marks.

When the composition is to be used as a nail varnish the preferred copolymers are copolymers of EEMA/-HEMA, MEMA/HEMA, and EEMA/MEMA. When it is to be used as a nail varnish the composition of the invention preferably includes pigments and resins. Nail varnish compositions in addition to giving a mositure vapour permeable and gas (preferably air) permeable coatings, are preferably such as to give tough, non-brittle, glossy coatings with good adhesion.

The composition when it is to be used as a nail varnish is preferably such that the resulting film on the nail is resistant to water, although it is possible to prepare compositions which after application may be removed by water for example a composition including a copolymer of 50% by volume EEMA and 50% by volume HEMA.

For cosmetic preparations the preferred copolymer is a 50/50 (volume percent) copolymer of EEMA/HEMA which will be slightly swollen by water. For cosmetic preparations a solvent is generally used which has a fast drying rate. One or more modifiers may be added to alter the properties of the cosmetic composition as desired. Suitable modifiers are plasticisers, humectants (e.g. glycerol) and water soluble polymers.

Using the preferred copolymers the cosmetic composition of the present invention may be easily applied to give a localised pigmented coating which is non-greasy, has good skin adhesion and does not run at body temperature. The preparation after application is flexible, water vapour permeable, easily removed by the use of water and is capable of use for up to 8 hours.

For wound dressings the preferred copolymers are copolymers of EEMA/HEMA; MEMA/HEMA and EEMA/MEMA. For wound dressings the preferred copolymer is a 70/30 (volume percent) copolymer of EEMA/MEMA.

The preferred solvents are ethyl acetate and an isopropanol/water mixture and the composition may be applied to the wound, scar or the like by a brush, although the preferred method of application is an aerosol. For use as an aerosol a propellant is added to the composition.

The wound dressings of the present invention are mositure vapour and gas (preferably air) permeable, are flexible and tough and if desired may be made transparent to enable the healing process to be observed.

By selecting the particular copolymer used a water resistant (affording better protection) or a water affected film (aiding removal) may be obtained.

Water resistant films will give better protection against the ingress of liquid, water and bacetria.

The invention also includes body coatings comprising copolymers as defined above.

The invention will now be further described by reference to the following examples.

EXAMPLE 1

A nail varnish composition was prepared by mixing the following ingredients.

| INGREDIENT | AMOUNT (GRAMS) |
| --- | --- |
| A copolymer of 80% by volume EEMA and 20% by volume HEMA | 4.5 |
| Santolite MHP (dissolved in 1 ml. of butyl acetate). | 0.3 |
| *Fluorescent pigment 600/RD-S4404 (dissolved in 1 ml. of ethyl acetate). | 0.1 |
| Amyl acetate | 4.5 |
| Isopropanol | 3.5 |

Santolite MHP is an aryl sulphoramid-formaldehyde marketed by Monsanto.
*Marketed by Industrial Colours Limited.

The resulting mixture when applied to a nail as a nail varnish, dried to form a pinhole free glossy film which was water vapour and gas permeable.

EXAMPLE 2

A composition was made up comprising the following ingredients.

| INGREDIENT | AMOUNT (parts by weight) |
| --- | --- |
| A copolymer of 50% by volume EEMA and 50% by volume HEMA | 12 |
| Polyvinyl pyrollidone | 4 |
| Glycerol | 14 |
| Isopropanol | 46 |
| Water | 20 |
| Black pigment | 10 |

The composition was used as an eye liner and produced a flexible pigmented coating which was water vapour and gas permeable.

EXAMPLE 3

A composition was prepared having similar ingredients to Example 2, but with a red pigment in place of the black pigment. The resulting composition was suitable for use as a stage make-up to simulate fresh and dried blood.

EXAMPLE 4

A composition comprising a 20% solution of a copolymer of 80% by volume EEMA and 20% by volume HEMA in ethyl acetate was prepared. This composition was suitable for use as a spray-on or brush-on wound dressing.

EXAMPLE 5

A composition comprising a 20% solution of a copolymer of 90% by volume MEMA and 10% by volume HEMA in ethyl acetate was prepared. This composition was suitable for use as a spray-on or brush-on wound dressing.

EXAMPLE 6

Compositions similar to example 4 and 5 were prepared using ethyl alcohol as solvent, in place of ethyl acetate. These compositions were suitable for spray-on or brush-on wound dressings.

EXAMPLE 7

A nail varnish composition was prepared by mixing the following ingredients:

| INGREDIENTS | AMOUNT (GRAMS) |
| --- | --- |
| A copolymer made by copolymerising a mixture of 50% by volume EEMA and 50% by volume MEMA | 4.5 |
| Santolite MHP (dissolved in 1 ml. of butyl acetate). | 0.3 |
| *Fluorescent pigment 600/RD-S4404 (dissolved in 1 ml. of ethyl acetate) | 0.1 |
| Amyl acetate | 4.5 |
| Isopropanol | 3.5 |

Santolite MHP is an aryl sulphonamide-formaldehyde marketed by Monsanto.
*Marketed by Industrial Colours Limited.

The resulting mixture when applied to a nail as a nail varnish dried to form a pinhole free glossy film which was water vapour and gas permeable.

EXAMPLE 8

A composition comprising a 20% solution in ethyl acetate of a copolymer obtained by copolymerising a mixture of 50% by volume EEMA and 50% by volume MEMA was prepared. This composition was suitable for use as a spray-on or brush-on wound dressing.

EXAMPLE 9

A composition comprising a 20% solution, in ethyl acetate, of a copolymer obtained by copolymerising a mixture of 60% by volume MEMA and 40% by volume EEMA was prepared. This composition was suitable for use as a spray-on or brush-on wound dressing.

EXAMPLE 10

Compositions similar to Examples 8 and 9 were prepared using isopropanol/water as solvent, in place of ethyl acetate. These compositions were suitable for spray-on or brush-on wound dressings.

EXAMPLE 11

A solution was made by mixing the following ingredients:

| INGREDIENTS | Parts by Weight |
|---|---|
| 70 : 30 EEMA/HEMA copolymer | 20 |
| Ethanol | 34 |
| Ethyl acetate | 34 |
| Polyvinyl pyrollidone | 7 |
| Glycerol | 5 |

The resulting solution was suitable for use as a brush-on wound dressing. The composition forms a flexible film on the skin about 1 minute after application. The film shows some resistance to removal by water but soaking in water will remove the film.

EXAMPLE 12

A solution was made by mixing the following ingredients:

| INGREDIENT | Parts by Weight |
|---|---|
| 80 : 20 EEMA/HEMA copolymer | 14 |
| Ethanol | 43 |
| Ethyl acetate | 31 |
| Polyvinyl pyrollidone | 8 |
| Glycerol | 4 |

The resulting solution was suitable for use as a brush-on wound dressing. The composition forms a flexible film on the skin about 1 minute after application. The film shows some resistance to removal by water but soaking in water will remove the film.

EXAMPLE 13

A copolymer was formed from the ingredients listed below by solvent polymerisation in Industrial methylated spirits for 24 hours in the presence of 1 ml. of tertiary butyl perctoate. The polymers were precipitated with petroleum ether and washed with water.

| | Parts by Volume |
|---|---|
| MEMA | 90 |
| HEMA | 10 |

Nail varnish compositions were prepared by admixing the following ingredients:

| INGREDIENT | Parts by Weight |
|---|---|
| Copolymer | 30 |
| *Solvent | 70 |
| D & C Red 19 dye | 0.01 |
| *Solvent consists of | Mls. |
| Toluene | 40 |
| Isobutyl acetate | 40 |
| n-Butanol | 10 |

The nail varnish solutions when brushed onto the nails dried to give a hard, glossy and moisture vapour permeable coating which does not peel off when exposed to water.

The compositions of each of Examples 4, 5, 6, 8, 9, 10 and 11 and 12 may be used as an aerosol formulation by the addition of a propellant. Some minor alteration of the proportion solvent may be necessary.

It will be appreciated that the copolymers used in the Examples could be replaced by any other copolymer useful according to the invention. For example the 50/50 EEMA/MEMA copolymer used in Examples 7 and 8 could be replaced e.g. by a copolymer obtained by copolymerising MEMA and EEMA in volume ratios of 80/20; 70/30; 60/40; 40/60; 30/70 or 20/80.

The EEMA used in the Examples contained 2-ethoxy ethyl methacrylate for the most part together with a very small proportion (less than one percent) of methyl methacrylate as an impurity.

The HEMA used in the Examples contained 2-hydroxy ethyl methacrylate for the most part together with small amounts (less than one percent each) of diethylene glycol monomethacrylate ethylene glycol di-methacrylate and methacrylic acid as impurities.

The MEMA used in the Examples contained 2-methoxy ethyl methacrylate for the most part together with a very small proportion (less than one percent) of methyl methacrylate as an impurity.

EXAMPLE 14

An aerosol composition was made up comprising the following ingredients:

| INGREDIENT | AMOUNT (Parts by Weight) |
|---|---|
| A syrup comprising a 40% solution of a copolymer of 70% by volume EEMA and 30% by volume MEMA dissolved in ethyl acetate | 5 |
| Acetone | 10 |
| "Arcton 12" propellant | 35 |
| "Arcton 11" propellant | 25 |

The composition was made up by adding the Acetone to the copolymer syrup and the Arcton 11 is then added to this mixture in a sealed container. The mixture is then transferred to a conventional aerosol container and the Arcton 12 is pressure filled into the container.

The above composition when sprayed onto the skin dries quickly to form a flexible, substantially non-tacky coating which is not affected by water. The coating can be removed from the skin by peeling without the need of a special solvent. A coating of 25g/sq.m. has a moisture vapour permeability of greater than 3000 g/sq.m/24 hrs/40°C/80% PH when measured by the Payne cup method. Wound areas spray coated with the above composition healed with no sign of maceration.

The copolymer syrup was prepared by heating under reflux for approximately 18 hours 70 parts by volume EEMA and 30 parts by volume MEMA together with 200 parts of ethyl acetate. The monomer mixture contained less than 1% methyl methacrylate as impurity and the copolymer contained less than 1% unreacted monomers.

"Arcton" is a Registered Trademark of Imperial Chemical Industries Ltd. for a range of chlorofluorocarbon propellants.

We claim:

1. A film-forming composition for application to the nail or epidermis of a human being as a nail varnish, a wound dressing or a cosmetic preparation, which comprises (i) a copolymer obtainable by copolymerizing a reaction mixture comprising from 80 to 20 parts by volume of ethoxy ethyl methacrylate with from 20 to 80 parts by volume of methoxy ethyl methacrylate, said copolymer contained in said composition being present in an amount sufficient to form a film on the epidermis of said human being, and (ii) a suitable carrier.

2. A composition according to claim 1, wherein the carrier is a solvent for the copolymer or a liquid which together with the copolymer forms an emulsion.

3. A composition according to claim 2, wherein the solvent comprises amyl acetate, isopropanol, toluene, ethanol, ethyl acetate, acetone or methyl ethyl ketone.

4. A composition according to claim 1 which also contains a pigment.

5. A composition according to claim 1 which also contains a plasticizer.

6. A composition according to claim 1 which also contains a humectant.

7. A film-forming composition for application to the nail or epidermis of a human being as a nail varnish or a wound dressing, which comprises (i) a copolymer, obtainable by copolymerizing from 80 to 20 parts by volume of (a) ethoxy ethyl methacrylate with from 20 to 80 parts by volume of (b) methoxy ethyl methacrylate, said copolymer contained in said composition being present in an amount sufficient to form a film on the epidermis of said human being, no other monomer units being present in said copolymer, and (ii) a suitable carrier.

8. A composition according to claim 7, wherein the copolymer is one obtainable by reacting methoxyethyl methacrylate and ethoxyethyl methacrylate in a volume ratio of 30 parts of methoxyethyl methacrylate and 70 parts of ethoxyethyl methacrylate.

9. A composition according to claim 7, wherein the carrier is a solvent for the copolymer or a liquid which together with the copolymer forms an emulsion.

10. A composition according to claim 9, wherein the solvent comprises amyl acetate, isopropanol, toluene, ethanol, ethyl acetate, acetone or methyl ethyl ketone.

11. A composition according to claim 7 which also contains a pigment.

12. A composition according to claim 7 which also contains a plasticizer.

13. A composition according to claim 7 which also contains a humectant.

14. A method of dressing wounds comprising applying a film-forming amount of a composition as defined in claim 1 to the wound area and drying the composition to form a moisture vapour and gas permeable film.

15. A method as defined in claim 14, wherein said film-forming composition is applied as an aerosol spray.

16. A method of dressing wounds comprising applying a film-forming amount of a composition as defined in claim 7 to the wound area and drying the composition to form a moisture vapour and gas permeable film.

* * * * *